United States Patent [19]

Frank

[11] Patent Number: 4,520,417

[45] Date of Patent: May 28, 1985

[54] ELECTRICAL MONITORING SYSTEMS

[75] Inventor: Louis M. Frank, Sunnyvale, Calif.

[73] Assignee: Raychem Corporation, Menlo Park, Calif.

[21] Appl. No.: 466,265

[22] Filed: Feb. 14, 1983

[51] Int. Cl.³ .............................................. H02H 3/33
[52] U.S. Cl. ....................................... 361/45; 361/49; 361/87; 340/652; 219/507; 219/510
[58] Field of Search ..................... 361/44–50, 361/42, 87; 340/652; 324/51; 219/519, 522, 507, 508, 509, 510

[56] References Cited

U.S. PATENT DOCUMENTS

| | | | |
|---|---|---|---|
| 2,999,189 | 9/1961 | Gerrard | 361/50 |
| 3,548,398 | 12/1970 | Strimling | 340/652 |
| 3,766,434 | 10/1973 | Sherman | 361/48 X |
| 3,800,121 | 3/1974 | Dean et al. | 361/44 |
| 3,997,818 | 12/1976 | Bodkin | 361/42 X |
| 4,068,276 | 1/1978 | Pintell | 361/50 X |
| 4,421,976 | 12/1983 | Jurek | 340/652 X |

Primary Examiner—Patrick R. Salce
Attorney, Agent, or Firm—Stephen C. Kaufman; Timothy H. Richardson; Herbert G. Burkard

[57] ABSTRACT

Electrical systems, especially elongate heating systems, include means for monitoring circuit continuity and/or absence of ground faults. The systems comprise a switching device, e.g. a thermostat, as well as a circuit breaker. When the switching device is on, a relatively high current passes through the circuit and when it is off, little or no current passes through the circuit. In one embodiment, a small controlled residual current flows in the circuit even when the switching device is off, and a current-detecting device signals when a discontinuity causes the current to drop below the expected value for the residual current. In another embodiment, the switching device is placed so that the heater (or other electrical load) is at a positive potential with respect to ground even when the switching device is off, and a ground fault indicator is used to compare the currents in the two legs of the circuit and to signal when a ground fault causes the currents to differ. Preferred circuits make use of both these embodiments. Preferably the fault circuits are powered by the same power source as the circuit which is being tested, but the fault indicators continue to signal faults even when the circuit is no longer powered, and both correction of the fault and powering of the circuit are required to cancel the fault indication.

8 Claims, 10 Drawing Figures

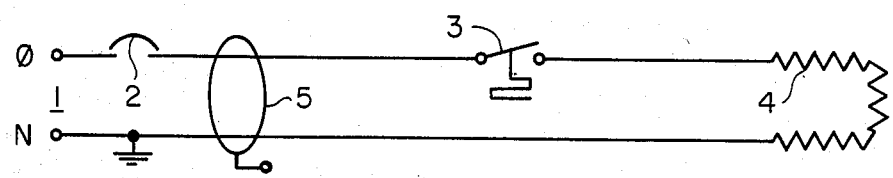
FIG_1
*(PRIOR ART)*
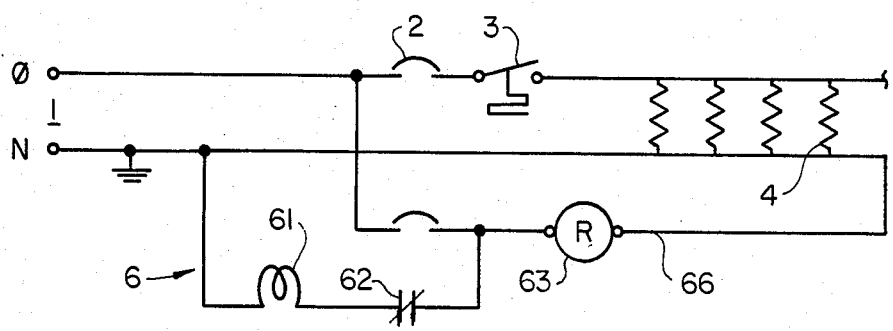
FIG_2
*(PRIOR ART)*
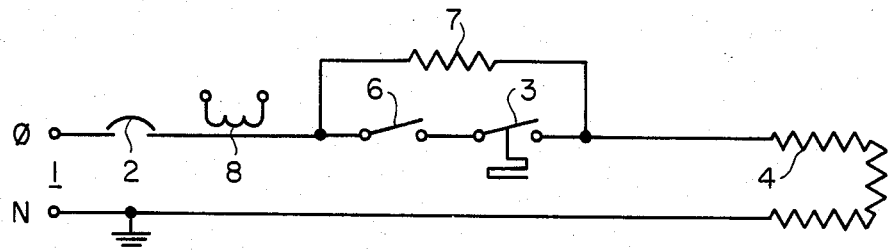
FIG_3

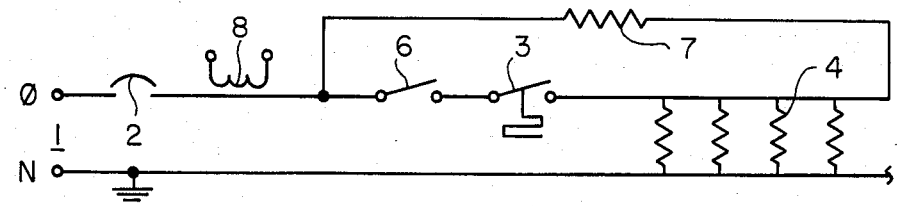
FIG_4
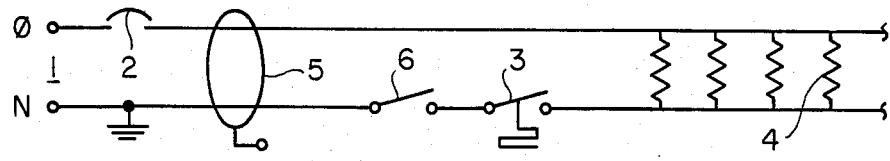
FIG_5
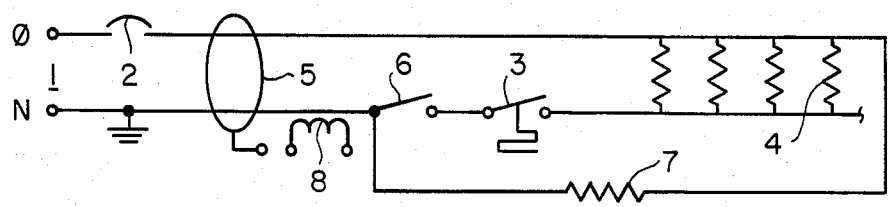
FIG_6
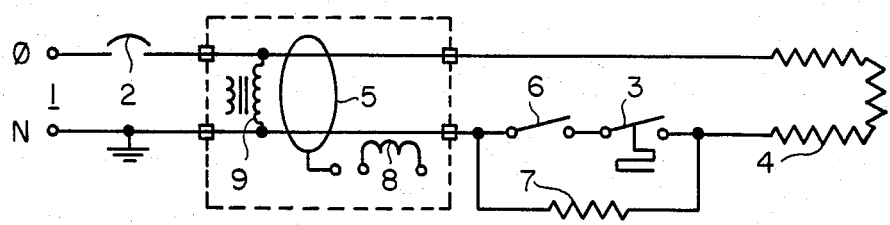
FIG_7

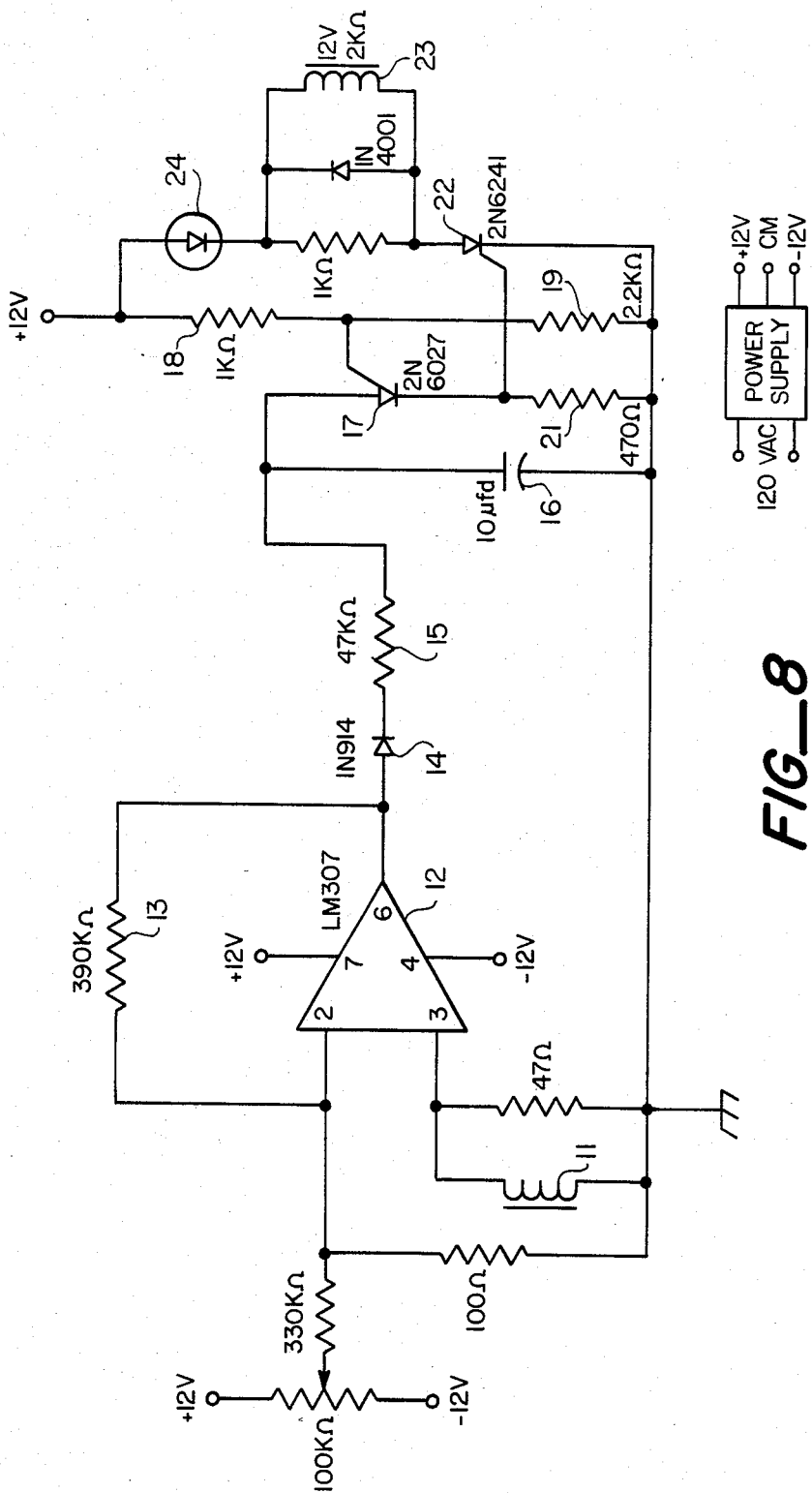
FIG_8

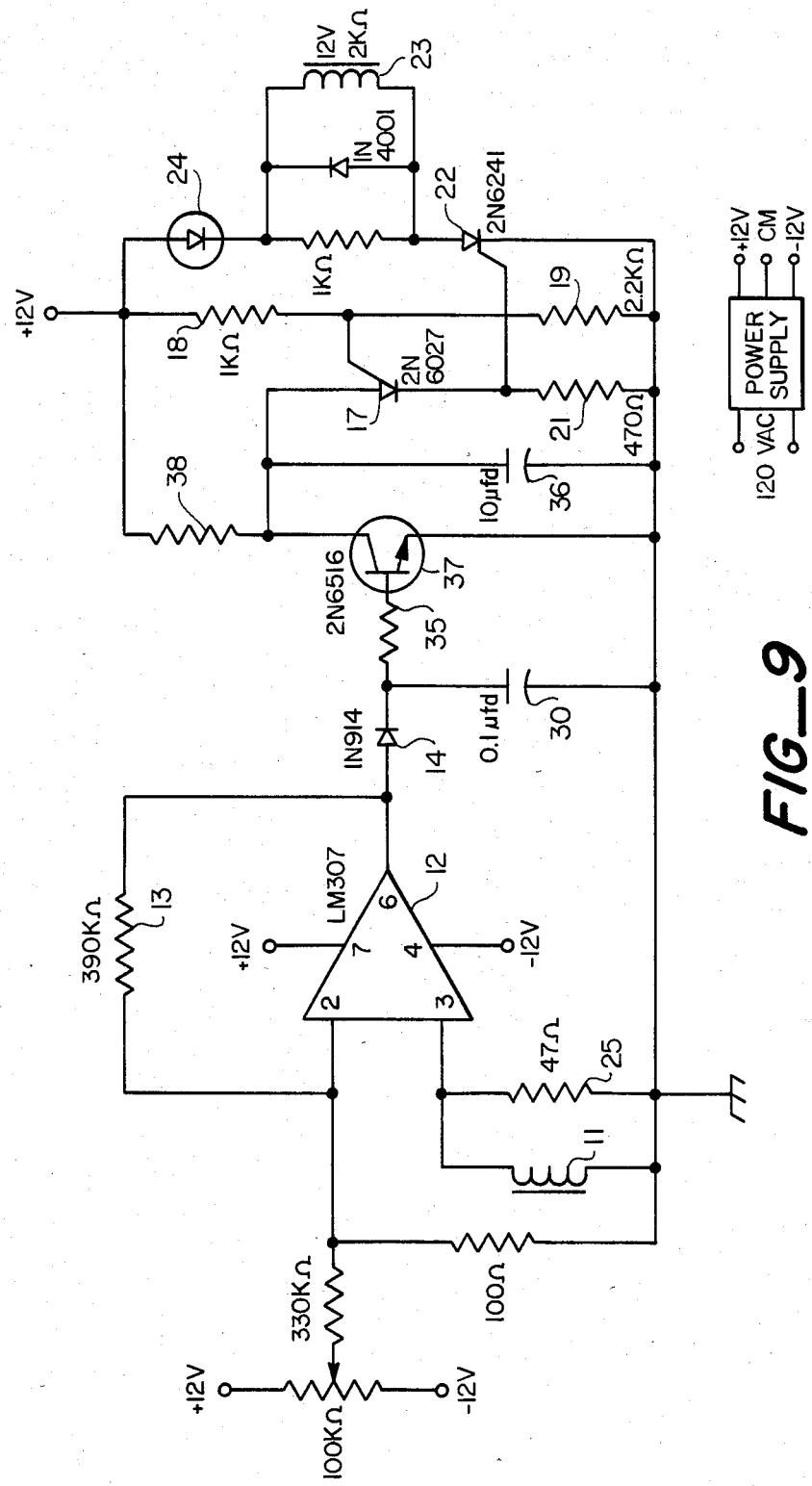
FIG_9

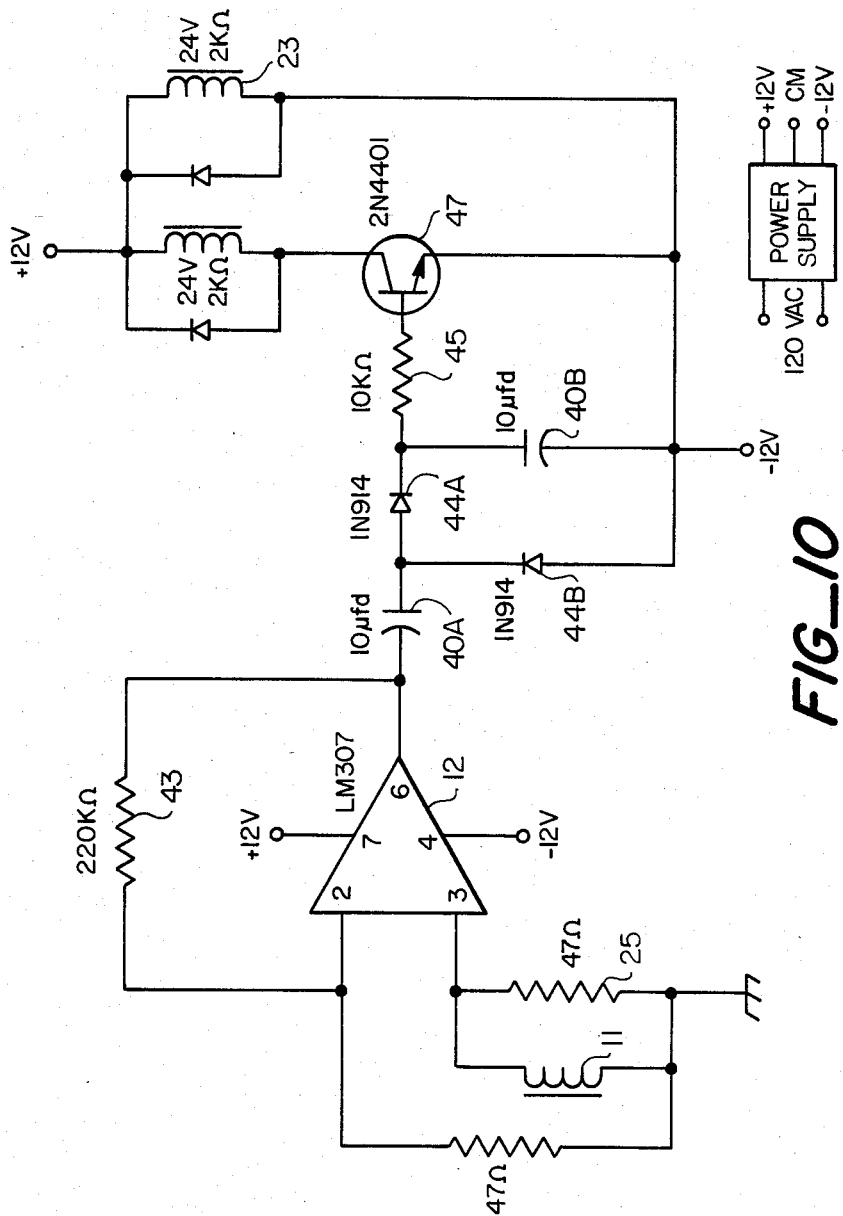
FIG_10

ELECTRICAL MONITORING SYSTEMS

FIELD OF THE INVENTION

This invention relates to electrical systems, especially systems including elongate electrical heaters.

INTRODUCTION TO THE INVENTION

Many elongate electrical heaters, e.g. for heating pipes, tanks and other apparatus, are known. Such heaters include series heaters such as mineral-insulated heating cables and parallel heaters which comprise two (or more) relatively low resistance conductors which run the length of the heater, with a plurality of heating elements connected in parallel with each other between the conductors. The heating elements in parallel heaters can be in the form of a continuous or segmented strip of conductive polymer which lies between the conductors. Alternatively the heating elements can be one or more resistive heating wires which progress down the length of the heater and are connected at intervals to alternate conductors; such heaters are usually referred to as zone heaters. For many uses, elongate heaters are preferably self-regulating. This can be achieved, in the first example of a parallel heater given above, by using a continuous or segmented strip of conductive polymer at least a part of which exhibits PTC behavior, and in the second example, by connecting the heating wire(s) to one or both of the conductors through a connecting element composed of a PTC material.

Elongate heaters of various kinds, and conductive polymers for use in such heaters, have been described in prior publications and in co-pending, commonly assigned, patent applications. Reference may be made for example to U.S. Pat. Nos. 2,952,761, 2,978,665, 3,243,753, 3,351,882, 3,571,777, 3,757,086, 3,793,716, 3,823,217, 3,858,144, 3,861,029, 4,017,715, 4,072,848, 4,085,286, 4,117,312, 4,177,376, 4,177,446, 4,188,276, 4,237,441, 4,242,573, 4,246,468, 4,250,400, 4,255,698, 4,271,350, 4,272,471, 4,304,987, 4,309,596, 4,309,597, 4,314,230, 4,315,237, 4,317, 027, 4,318,881 and 4,330,704; J. Applied Polymer Science 19, 813-815 (1975), Klason and Kubat; Polymer Engineering and Science 18, 649-653 (1978), Narkis et al; and commonly assigned U.S. Ser. Nos. 601,424 (Moyer), now abandoned, published as German OLS No. 2,634,999; 750,149 (Kamath et al.), now abandoned, published as German OLS No. 2,755,077; 732,792 (Van Konynenburg et al.), now abandoned, published as German OLS No. 2,746,602; 751,095 (Toy et al), now abandoned, published as German OLS No. 2,755,076; 798,154 (Horsma et al), now abandoned, published as German OLS No. 2,821,799; 134,354 (Lutz); 141,984 (Gotcher et al.), published as European Application No. 38718; 141,987 (Middleman et al.), published as European Application No. 38715, 141,988 (Fouts et al.), also published as European Application No. 38718, 141,989 (Evans), published as European Application No. 38713, 141,991 (Fouts et al.), published as European Application No. 38714, 142,053 (Middleman et al.), published as European Application No. 38716, 150,909 (Sopory) and 150,910 (Sopory), published as UK Application No. 2076106 A, 184,647 (Lutz), 250,491 (Jacobs et al.) and 254,352 (Taylor), published as European Application No. 63,440, 273,525 (Walty), 274,010 (Walty et al.), 272,854 (Stewart et al.), 300,709 (van Konynenburg et al.), 369,309 (Midgley et al.), 380,400 (Kamath) and 418,354 (Gurevich). The disclosure of each of the patents, publications and applications referred to above is incorporated herein by reference.

Many heater systems, and other electrical systems, are regularly switched between a normal operating condition in which substantial current passes through the heater (or other electrical load) and a non-operating condition in which no current passes through the load. Such switching is accomplished by a switching device, for example a thermostat. When using a DC or single phase AC power source, the switching device is placed in the live leg of the circuit so that the load is at substantially zero potential when the switching device is off. When using a two phase power source, a two pole thermostat is used so that both legs of the circuit are cut. Electrical safety codes usually require that the system also contains a circuit breaker in all live legs of the circuit.

In electrical heater systems, as in other electrical systems, it is important to know when an insulation failure has caused the load to be connected to ground or when circuit continuity has been interrupted. While the system is switched on, it is usually relatively simple to monitor for ground faults and for lack of continuity. Thus it is well known to use a ground fault detector to compare the currents in the two legs of an operating circuit, and thus to determine whether there is a leakage current which is caused by a ground fault. Likewise, it is well known to monitor the continuity of an operating system, for example by including in the circuit a signal lamp which fails to light up when continuity is lost, or by inspecting of the desired function of the system. It is also known to monitor the continuity of a self-regulating elongate parallel heater system, powered by a single phase AC source, both when the system is switched on and when it is switched off, by means of a third conductor which is connected to the far end of the neutral conductor of the heater and, through an alarm circuit, to the active terminal of the power supply.

A serious drawback of many of the known methods for monitoring circuit continuity and absence of ground faults is that they do not operate when the thermostat or other switching device is open. Thus faults which develop while the switching device is open are not detected until the very time when the system is required to operate. The use of a third conductor in conjunction with an elongate parallel heater powered by single phase AC makes it possible to monitor for continuity even when the thermostat is open, but detection of ground faults at the same time is not possible; furthermore the third conductor returns all the way back to the power source, which is particularly disadvantageous when the heater is distant from the power source.

SUMMARY OF THE INVENTION

This invention relates to new and improved methods of monitoring electrical systems, especially elongate systems, particularly systems comprising elongate heaters, for example a series heater or a parallel heater, particularly a self-limiting heater, as described above.

In one embodiment of the invention, a small residual current of substantially predetermined value flows in the circuit even when the switching device is off. This result can be achieved by placing a high impedance component in parallel with the switching device, or by using a switching device which, even when it is "off", allows a small residual current to pass, e.g. a triac. The system also comprises a current-detecting device which signals when lack of continuity causes the circuit current to fall below that predetermined value. The current-detecting device can be one which automatically ceases to provide a signal if continuity is restored, or it can be one which, until it is deliberately reset, continues to provide a signal even if continuity is restored. The current-detecting device is preferably powered by the same power source as the circuit which it is monitoring. A preferred example of this embodiment of the invention is an electrical system which comprises (a) a source of electrical power;
(b) a circuit breaker connected to each live terminal of the power source;
(c) an electrical load which is connected to the power source through
(d) an electrical switching device which has a low impedance when it is closed and a high, but not infinite, impedance when it is open; and
(e) a current-detecting device which monitors the current through the load and which signals when the current through the load is less than a predetermined value;

whereby (1) when the circuit breaker is closed and the switching device is closed, a first relatively high current flows through the load; (2) when the circuit breaker is closed and the switching device is open, a second relatively low current flows through the load, the value of said relatively low current being higher than said predetermined value; and (3) the current-detecting device signals when a fault causes the current through the load to fall below said predetermined value. A particular advantage of this aspect of the invention is that the current-detecting device can be placed at a location which is physically distant from the heater (or other load), e.g. a central control point from which a number of heater systems are monitored.

In another embodiment, the switching device is placed in the neutral leg of a circuit powered by DC or single phase AC, or in only one leg of a circuit powered by two phase AC, so that the heater (or other load) is at a positive potential with respect to ground even when the switching device is off; and the system comprises a ground fault indicator which compares the currents in the legs of the circuit and signals when a ground fault in the load causes a higher current to flow in one leg of the circuit than in the other. The ground fault indicator is preferably one which provides (directly or indirectly) a signal which continues to show that a ground fault has been detected, even if power is removed from (or reduced in) the circuit for any reason. The indicator can be one which automatically ceases to provide a signal if the ground fault is removed, or it can be one which, until it is deliberately reset, continues to provide a signal that a ground fault has occurred, even if the ground fault is removed. A preferred example of this embodiment of the invention is an electrical system which comprises (i) a source of electrical power;
(ii) a circuit breaker connected to each live terminal of the power source;
(iii) an electrical load;
(iv) a first electrical connection means which is live and which connects the power source to the electrical load;
(v) a second electrical connection means which connects the power source to the electrical load;
(vi) an electrical switching device which has a low impedance when it is closed and a high impedance (which may be infinite) when it is open and which lies in the second electrical connection means, so that the load is live when the circuit breaker is closed, both when the switching device is closed and when it is open; and
(vii) a ground fault indicator which signals a difference between the current flowing in the first connection means and the current flowing in the second connection means, signals a leakage from the electrical load to ground both when the switching device is closed and when it is open.

Particularly preferred systems of the invention combine both the above embodiments. In such systems, the various components are preferably selected so that the residual current (which flows when the switching device is off) is substantially higher than, for example at least 10 milliamps, e.g. 10 to 30 milliamps, higher than, the diference in the currents flowing in the two legs of the heater circuit when a ground fault occurs.

In another aspect, the invention provides novel electrical apparatus which is useful in electrical systems as defined above and which comprises (A) a housing;
(B) accessible from the exterior of said housing, first, second, third and fourth electrical terminals, and
(C) within the housing
  (a) a first electrical connection means which connects the first and second terminals;
  (b) a second electrical connection means which connects the third and fourth terminals;
  (c) current-comparing means which compares the currents flowing in the first and second connection means and which signals when they are substantially different; and
  (d) current-detecting means which detects and signals when the current in one of the electrical connection means falls below a first predetermined value, said first predetermined value being not more than 200 milliamps, the current-detecting means retaining its ability to carry out said detecting and signalling function while the current in said electrical connection means remains above a second predetermined value for an extended period of time, said second predetermined value being at least 2 amps.

The first and second electrical connection means are preferably low impedance conductors. The apparatus preferably also comprises, within the housing, voltage-detecting means which detects and signals when the voltage drop between the first and second connection means falls below a predetermined value, and which thus monitors the power supply of a system to which the apparatus is connected. The housing is of course insulated from the various components, and it may be composed of electrically insulating material.

Apparatus as described above can be used at a location remote from the heater (or other load), the heater being connected to the apparatus merely by a pair of leads connected to the first and third terminals and the power source being connected to the second and fourth terminals.

BRIEF DESCRIPTION OF THE DRAWINGS

The invention is illustrated in the accompanying drawing, in which

FIGS. 1 and 2 show systems of the prior art;
FIGS. 3 to 7 show systems of the invention;

FIG. 8 shows a circuit for use as a ground fault indicator in the systems of the invention;

FIG. 9 shows a circuit for use as a current-detecting device in the systems of the invention; and FIG. 10 shows another circuit for use as a current-detecting device in the present invention.

DETAILED DESCRIPTION OF THE INVENTION

Preferably the system makes use of a switching device which has a low impedance (often substantially zero) when it is closed and a high, but not infinite, impedance when it is open. It is often most convenient for such a device to comprise a conventional thermostat (or a combination of conventional switching devices) and an electrical component which is connected in parallel with the thermostat and which has an impedance substantially higher, preferably at least 100 times higher, than the electrical load in series with the switching device. When the electrical load has a variable impedance, e.g. when it is a self-limiting heater, the impedance of the component is substantially higher than the maximum impedance of the load under normal operating conditions. Thus the impedances of the load and the component can be selected so that the relatively high current (when the circuit breaker and the switching device are closed) is at least 1 amp, e.g. at least 2 amps, often at least 10 amps, e.g. 30 to 100 amps, and the relatively low current (when the circuit breaker is closed and the switching device is open) is less than 200 milliamps, e.g. less than 100 milliamps. When an elongate parallel heater is used, the electrical component should be connected in parallel not only with the thermostat but also with the whole length of one of the elongate connection means of the heater. The component may be a resistor, usually having a resistance of at least 1000 ohms, and often substantially higher, e.g. at least 10,000 ohms. When an AC power source is used, the component can also be a capacitive or inductive load or a mixture of resistive, capacitive and inductive loads.

The current-detecting device should be selected so that it will not be damaged when the relatively high current is flowing in the circuit. Current-detecting means which will detect and signal when the current in a conductor falls below a predetermined value which is not more than 200 milliamps, and which will remain undamaged when the current remains for an extended time above a predetermined value which is at least 30 amps, are believed to be novel, but those skilled in this technology will have no difficulty, having regard to the disclosure of this specification, in designing and building suitable detection circuits. Preferred current-detecting means for use in the present invention are illustrated in FIGS. 9 and 10 and are described in detail below.

Ground fault indicators suitable for use in the present invention are well known to those skilled in the art.

Referring now to the drawing, in which corresponding components in the various circuits are given the same reference numeral, FIG. 1 shows a prior art circuit comprising a DC or a single phase AC power supply 1, a circuit breaker 2 and a thermostat 3 in the live leg of the circuit, a series heater 4 and a ground fault detector 5. It will be seen that when the circuit breaker 2 and the thermostat 3 are closed, the ground fault detector (which compares the currents in the two legs of the circuit) will perform its desired function; but it will not do so if either the circuit breaker or the thermostat is open.

FIG. 2 shows a prior art circuit which comprises a DC or single phase AC power supply 1, a circuit breaker 2 and a thermostat 3 in the live leg of the circuit, an elongate parallel heater 4, and a continuity fault detector circuit 6 which is connected via lead 66 to the far end of the parallel heater 4. The fault circuit 6 includes fault light 61, relay contact 62 which is normally closed, and relay coil 63. It will be seen that if both conductors of the parallel heater are cut, the resulting lack of continuity will cause the alarm circuit to operate.

FIG. 3 shows a circuit of the invention which is similar to FIG. 1 but which contains an additional switch 6 in the live leg of the circuit and a resistor 7 in parallel with the additional switch 6 and the thermostat 3, as well as a current-detecting device 8 in the live leg of the circuit. Resistor 7 has a much larger resistance than heater 4. It will be seen that if circuit breaker 2 is closed, then even if the additional switch 6 and the thermostat 3 are open, a small residual current will flow through the heater, so long as continuity is maintained. However, if continuity is broken, there will be no residual current (or a much smaller current if continuity is broken and a ground connection made to the live leg), and device 8 will signal the lack of continuity.

FIG. 4 is the same as FIG. 3 except that series heater 4 is replaced by elongate parallel heater 4 and the resistor 7 is connected to the remote end of the heater 4. It will be seen that if circuit breaker 2 is closed, then even if the additional switch 6 and the thermostat 3 are open, a small residual current will flow through the heater, so long as continuity is maintained. However, if both conductors of the parallel heater are cut, there will be no residual current (or a much smaller current if continuity is broken and the live end is connected to ground), and device 8 will signal the lack of continuity.

FIG. 5 shows a circuit of the invention which comprises a DC or single phase AC power supply, a circuit breaker 2 in the live leg of the circuit, an elongate parallel heater 4, and a thermostat 3 and an additional switch 6 in the neutral leg of the circuit, and a ground fault detector 5. It will be seen that if the circuit breaker 2 is closed, the detector 5 will signal a ground fault in the heater, whether or not either or both of switch 6 and thermostat 3 are open. If switch 6 and thermostat 3 are closed and the heater has a ground fault, the current levels in both legs will be relatively high, but the current level in the neutral leg will be lower. If either switch 6 or thermostat 3 is open, no current will flow in either leg if there is no ground fault; but if there is a ground fault, a low current will flow in the live leg and none in the neutral leg.

FIG. 6 is a circuit of the invention which provides for monitoring of both continuity and ground faults. The circuit comprises a DC or single phase AC power supply, a circuit breaker 2 in the live leg of the circuit, an elongate parallel heater 4, a thermostat 3, and an additional switch 6 in the neutral leg of the circuit, a ground fault detector 5, a resistor 7 connected to the remote end of the heater in parallel with the switch 6 and the thermostat 3, and a current detector 8 which monitors the current in the neutral leg. Resistor 7 has a much larger resistance than the heater 4. It will be seen that, as in FIG. 5, ground fault detector 5 will signal a ground fault in the heater whether the switch 6 and thermostat 3 are open or closed. It will also be seen that current detector 8 will signal a continuity failure whether switch 6 and thermostat 3 are open or closed, since a small residual current flows through resistor 7 even if one or both is open, and no current will flow through resistor 7 if both conductors of heater 4 are cut.

FIG. 7 is similar to FIG. 6, using a series heater 4 instead of the parallel heater. In addition, FIG. 7 shows a potential transformer 9 which signals if there is a power failure. The Figure also indicates, by means of a housing shown in dashed lines and four terminals shown by boxes, how the three monitoring functions can be contained within a single unit. A potential transformer for detection of power failure can of course be used with any of the A.C. circuits illustrated.

Referring now to FIG. 8, this shows a circuit for use as a ground fault indicator in the systems of the invention. The circuit includes a transformer 11 which comprises a high permeability, stamped iron, toroidal core, two single turn primary coils (not shown) each of which lies in one leg of the heater circuit, and a 1000 turn secondary coil. When the currents in the two primary coils are the same, no current is induced in the secondary; when the currents are different, a ground fault current is induced in the secondary coil. The transformer should generally be such that the detection circuit signals a difference between the currents in the primary coils of about 5 to 30 milliamps. The current in the secondary coil is fed to an operational amplifier 12 of the integrated circuit type which, with a feedback resistor 13, converts the current into a voltage signal. The voltage signal is fed through a diode 14 and a current-limiting resistor 15 to charge an integrating capacitor 16; this provides for half-wave DC rectification over a time period determined by 15 and 16. If the ground fault current exceeds a predetermined value (e.g. 5 milliamps) for more than one half cycle of the AC wave form, the capactor 16 becomes charged. Capacitor 16 is connected to one terminal of a programmable unijunction transistor 17, which compares the voltage of capacitor 16 with a fixed voltage established by a pair of resistors 18 and 19 which operate as a DC voltage divider from a fixed power supply. When the voltage of capacitor 16 reaches a predetermined level, the transistor 17 switches to a low impedance state and discharges capacitor 16 through resistor 21. Discharge of the capacitor 16 causes a pulse to trigger a silicon-controlled rectifier 22, thus putting the rectifier into an "on" state and operating a relay 23 and a light emitting diode 24. The diode 24 will remain lit until power is removed from the circuit, even if the ground fault is removed.

Referring now to FIG. 9, this shows a circuit for use as a current-detecting device in the systems of the invention. FIG. 9 is somewhat similar to FIG. 8, but the primary coil on the transformer comprises a single primary coil which lies in one leg of the heater circuit, and the circuit is designed to indicate when the current in the secondary coil of the circuit falls below a predetermined value (rather than when this current rises above a certain value).

In the normal operating condition of the circuit of FIG. 9, the current in the primary is above a predetermined value, e.g. about 50 to 100 milliamps when the heater is switched off, and relatively very high above, e.g. 20 amps, for example up to about 50 amps, when the heater is switched on. The current in the secondary coil is fed to an operational amplifier 12 of the integrated circuit type which converts the current into a voltage signal. The voltage signal is fed through a diode 14 to charge an integrating capacitor 30, which is connected via resistor 35 to signal-inverting transistor 37; capacitor 30 and resistor 35 are selected so that the transistor 37 is maintained in the "on" state so long as the current in the primary exceeds a predetermined level, e.g. 30 milliamps. When the heater is on, and the primary current is therefore high, the transformer will be saturated and the operational amplifier will also be saturated and will be operating in a non-linear mode; at the same time, the transformer is terminated by the input resistance 25 and is therefore not dependent on the performance of the amplifier to maintain the termination impedance. If the current in the primary drops below the predetermined level, the capacitor 30 discharges and the transistor 37 is converted to the "off" state. This in turn results in charging a second integrating capacitor 36 by resistor 38, which is chosen for a specific time integration. Capacitor 36 is connected to programmable unijunction transistor 17, which compares the voltage of capacitor 36 with a fixed voltage established by a pair of resistors 18 and 19 which operate as a DC voltage divider from a fixed power supply. When the voltage of capacitor 36 reaches a predetermined value, transistor 17 switches to a low impedance state and discharges capacitor 36 through resistor 21. Discharge of capacitor 36 causes a pulse to trigger silicon controlled rectifier 22, thus putting the rectifier into an "on" state and operating a relay 23 and a light-emitting diode 24. The diode 24 will remain lit until power is removed from the circuit, even if continuity is restored to the heater circuit.

Referring now to FIG. 10, this shows a circuit for use as a current-detecting device in the systems of the invention when it is desired that the device should signal a continuity failure only when such a failure is present, i.e. when there has been a continuity failure but continuity has been restored, there is no signal.

As in FIG. 9, the circuit comprises a high permeability, stamped iron, toroidal core, a single turn primary coil (not shown) which lies in one leg of the heater circuit, and a 1000-turn secondary coil. The current in the secondary coil is fed to an operational amplifier 12 which converts the current into a voltage signal. This signal is fed to a voltage doubler circuit comprising diodes 44A and 44B and integrating capacitors 40A and 40B, thus averaging the positive and negative signals from the amplifier and providing an output which is fed through current-limiting resistor 45 to transistor 47 and which maintains the transistor in the "on" state so long as the primary current exceeds a predetermined value, e.g. 30 milliamps. While the transistor is on, relay 23 is closed. If the primary current falls below the predetermined level, the transistor is converted to the off state and relay 23 opens, thus triggering a signal.

I claim:
1. An electrical system which comprises
 (i) a source of electrical power having a first and a second live terminal;
 (ii) a circuit breaker connected to each live terminal of the power source;
 (iii) an electrical load;
 (iv) a first electrical connection means which is live and which connects the power source to the electrical load;
 (v) a second electrical connection means which connects the power source to the electrical load;
 (vi) an electrical switching device which has a low impedance when it is closed and a high impedance when it is open and which lies in the second electrical connection means; and (vii) a ground fault indicator which signals a difference between the current flowing in the first connection means and the current flowing in the second connection means;

whereby the load is live when the circuit breaker is closed, both when the switching device is closed and when it is open, and the ground fault indicator will signal a leakage from the electrical load to ground both when the switching device is closed and when it is open.

2. A system according to claim 1 wherein the switching device comprises a thermostat.

3. A system according to claim 1 wherein the electrical load is an elongate series heater.

4. A system according to claim 1 wherein the electrical load is an elongate parallel heater.

5. A system according to claim 1, further comprising a current-detecting device which monitors the current through the load, both when the switching device is open and when the switching device is closed and which signals when the current through the load is less than a predetermined value.

6. A system according to claim 5, wherein said current-detecting device detects and signals when the current in one of the electrical connection means falls below a first predetermined value, said first predetermined value being not more than 200 milliamps, the current-detecting device remaining undamaged while the current in said electrical connection means remains above a second predetermined value for an extended period of time, said second predetermined value being at least 2 amps.

7. A system according to claim 6 wherein the first predetermined value is not more than 100 milliamps and the second predetermined value is at least 20 amps.

8. A system according to claim 1 wherein the electrical load is a self-limiting heater.

* * * * *